United States Patent
Wodara et al.

(10) Patent No.: US 9,053,829 B2
(45) Date of Patent: Jun. 9, 2015

(54) PIPE SHUT-OFF DEVICE AND APPARATUS HAVING SAME FOR THE EMERGENCY SUPPLY OF COOLANT TO THE FUEL RODS ARRANGED IN THE REACTOR VESSEL OF A NUCLEAR POWER PLANT

(71) Applicant: AREVA GmbH, Erlangen (DE)

(72) Inventors: Gunter Wodara, Bad Arolsen (DE); Matthias Schubert, Hofgeismar (DE); Sigurd Adam, Langenlonsheim (DE)

(73) Assignee: AREVA GmbH, Erlangen (DE)

( * ) Notice: Subject to any disclaimer, the term of this patent is extended or adjusted under 35 U.S.C. 154(b) by 0 days.

(21) Appl. No.: 14/078,733

(22) Filed: Nov. 13, 2013

(65) Prior Publication Data
US 2014/0174555 A1   Jun. 26, 2014

(30) Foreign Application Priority Data
Dec. 22, 2012  (EP) .................................. 12008603

(51) Int. Cl.
| | |
|---|---|
| F16K 17/40 | (2006.01) |
| G21C 15/18 | (2006.01) |
| F16K 17/38 | (2006.01) |
| G21C 9/008 | (2006.01) |
| G21C 9/016 | (2006.01) |
| G21C 9/02 | (2006.01) |
| G21C 9/033 | (2006.01) |

(52) U.S. Cl.
CPC ................ *G21C 15/18* (2013.01); *F16K 17/38* (2013.01); *G21C 9/008* (2013.01); *G21C 9/016* (2013.01); *G21C 9/024* (2013.01); *G21C 9/033* (2013.01); *Y02E 30/40* (2013.01)

(58) Field of Classification Search
CPC ...... F16K 13/04; F16K 17/633; F16K 17/403
USPC ......... 137/68.11, 68.12, 68.13, 68.19, 72, 79, 137/797; 251/66, 67, 74, 75
See application file for complete search history.

(56) References Cited

U.S. PATENT DOCUMENTS

| | | | | |
|---|---|---|---|---|
| 2,736,459 | A | * | 2/1956 | Cockram et al. ............. 220/89.4 |
| 3,129,716 | A | * | 4/1964 | Fox ............................ 137/68.13 |
| 3,666,616 | A | | 5/1972 | Schluderberg |
| 3,670,925 | A | * | 6/1972 | Moyant ............................ 222/3 |

(Continued)

FOREIGN PATENT DOCUMENTS

| | | |
|---|---|---|
| DE | 2326004 A1 | 12/1973 |
| DE | 19523303 A1 | 1/1997 |

(Continued)

OTHER PUBLICATIONS

Office Action for co-pending European patent application No. 12008603.8-1556 dated Oct. 31, 2014.

*Primary Examiner* — John K Fristoe, Jr.
*Assistant Examiner* — Minh Le
(74) *Attorney, Agent, or Firm* — Gifford, Krass, Sprinkle, Anderson & Citkowski, P.C.; Douglas L. Wathen

(57) ABSTRACT

A pipeline shut-off device (10) comprising a tube section (10a) arranged in a pipeline (3) and having a shut-off member (19), wherein the shut-off member (19) can be destroyed in the closed position by a device (22) arranged in the region of the pipe section (10a), with the device for destroying the shut-off member (19) being able to be actuated from the outside.

10 Claims, 2 Drawing Sheets

(56) References Cited

U.S. PATENT DOCUMENTS

| | | | | |
|---|---|---|---|---|
| 3,915,235 A | * | 10/1975 | Hamilton et al. | 169/28 |
| 3,938,704 A | * | 2/1976 | Milgram | 222/5 |
| 4,084,602 A | * | 4/1978 | Cook | 137/68.13 |
| 5,076,312 A | * | 12/1991 | Powell | 137/68.25 |
| 5,960,812 A | * | 10/1999 | Johnson | 137/68.14 |
| 5,979,477 A | * | 11/1999 | Stillings | 137/1 |
| 6,938,421 B2 | * | 9/2005 | Foster-Pegg | 60/646 |
| 7,281,544 B2 | * | 10/2007 | Bocquart | 137/68.19 |
| 7,878,215 B2 | * | 2/2011 | McLelland et al. | 137/68.26 |
| 8,235,249 B2 | * | 8/2012 | Hollars et al. | 222/5 |
| 2002/0006513 A1 | * | 1/2002 | Clark | 428/408 |
| 2005/0217724 A1 | * | 10/2005 | Bocquart | 137/68.19 |
| 2006/0137742 A1 | * | 6/2006 | Smith et al. | 137/68.13 |
| 2009/0314355 A1 | * | 12/2009 | Szeglin | 137/68.13 |
| 2010/0127195 A1 | | 5/2010 | McLelland et al. | |

FOREIGN PATENT DOCUMENTS

| | | |
|---|---|---|
| WO | 9429877 A1 | 12/1994 |
| WO | 2011121336 A1 | 10/2011 |

\* cited by examiner

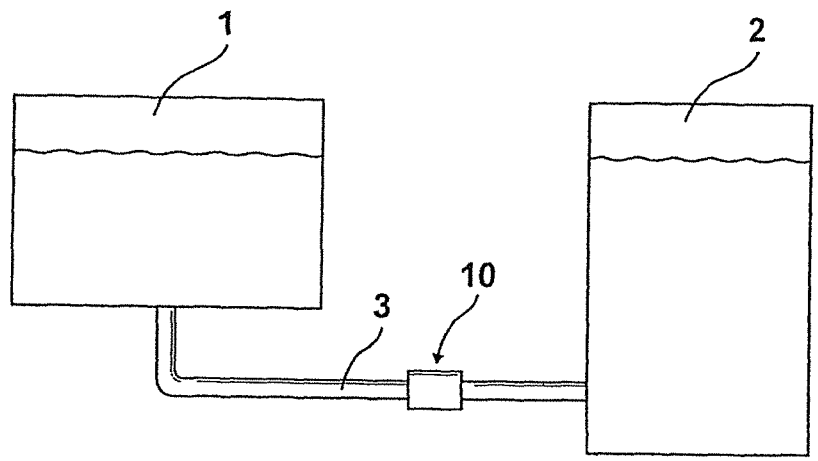
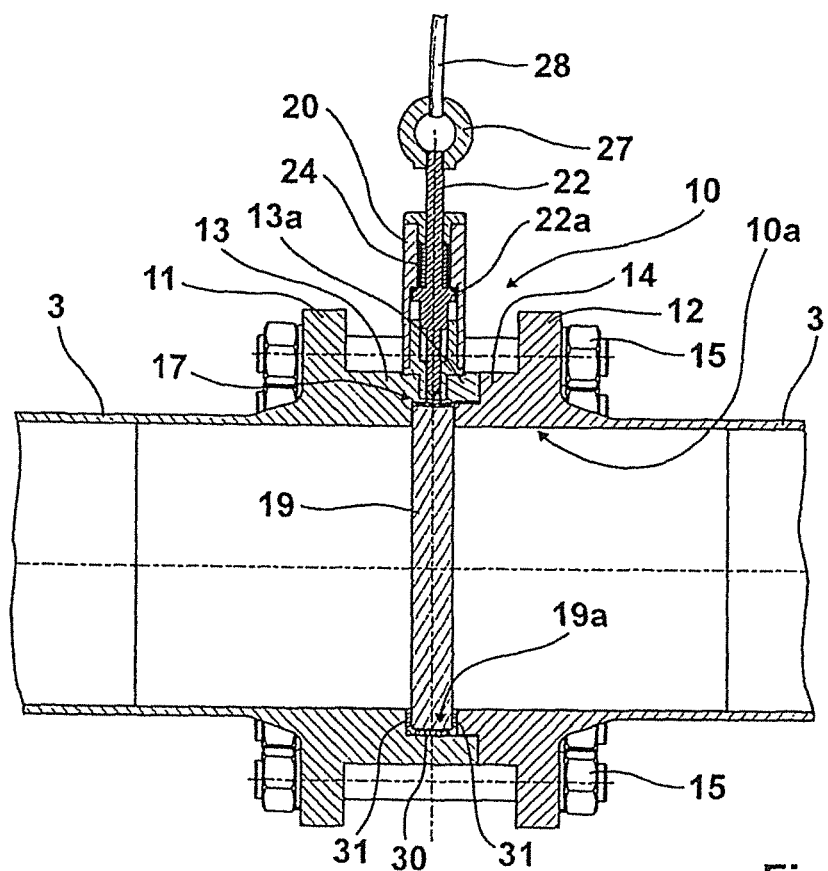

PIPE SHUT-OFF DEVICE AND APPARATUS HAVING SAME FOR THE EMERGENCY SUPPLY OF COOLANT TO THE FUEL RODS ARRANGED IN THE REACTOR VESSEL OF A NUCLEAR POWER PLANT

REFERENCE TO RELATED APPLICATION

This application claims priority from European Patent Application Serial No. EP 12 008 603.8, filed Dec. 22, 2012, the contents of which are incorporated herein in their entirety.

FIELD OF THE INVENTION

The invention relates, on the one hand, to a pipe shut-off device comprising a pipe section arranged in a pipeline and having a shut-off member and, on the other hand, to an apparatus for the emergency supply of coolant to the fuel rods in a reactor vessel of a nuclear power plant on an incipient core meltdown comprising a vessel for receiving the coolant which is connected to the reactor vessel by at least one pipeline.

BACKGROUND OF THE INVENTION

Pipe shut-off devices for the emergency supply of coolant to the fuel rods arranged in a reactor vessel of a nuclear power plant with coolant are known. In this respect, a shut-off device is provided in the pipeline and has the following configuration. A pivotable check valve is arranged in the pipeline and is a component of the pipe shut-off device. The pivot axis of the check valve has a lever arm, with a weight being arranged at the end of the lever arm. The weight is held by a rope or by a chain in a position in which the check valve shuts off the pipeline. Provision is made on an incipient core meltdown that this chain or the rope melts, the weight moves downward due to gravity and in so doing the check valve of the pipe shut-off device is opened against the applied coolant. This design of such a pipe shut-off device has various disadvantages. Boron-treated water serves as the coolant for the reactor vessel. The pivotable check valve is seated under the pressure of the applied coolant and of the weight in the closed state of the valve on a metal flat seal arranged in the pipe section of the pipe shut-off device. Boron-treated water is extremely aggressive toward metals so that the boron-treated water attacks the metal seal over the course of time. This can result in leaks, so a reservoir is provided in the region of the shut-off device to receive the leak liquid. In order to be able to ensure leaktightness in the long term, recurring checks are required at fixed, brief time intervals. Such checks of the function of the check valve are complex and/or expensive; a further shut-off valve having an electric drive is located in front of the check valve in the direction of flow. It has to be closed for the check in order to drain and dispose of the coolant present between the shut-off valve and the check valve in a controlled manner. Subsequent hereto, the function of the check valve is tested, with here the rope or the chain being released which holds the check valve in a closed position against the force of the weight. Not only the high service effort is a disadvantage with this shut-off device, but also the asymmetrical arrangement of the check valve at the neutral axis, which is problematic in dynamic load cases. High opening forces are furthermore required since the valve has to be opened against the dynamic pressure of the coolant. It is furthermore disadvantageous that this pipe shut-off device comprises a number of individual parts which make such a shut-off device very expensive.

Furthermore, a pipe shut-off device is known in which a valve disk is rotatably supported in a pipe section by an electrical drive. So-called soft seals are provided in this respect which have the disadvantage that they are not age-resistant. This means that brief service intervals are also provided here. A leak container is also provided here despite the close service intervals.

SUMMARY OF THE INVENTION

The underlying object of the invention accordingly comprises a pipe shut-off device which is leaktight in the long term, substantially maintenance-free and unproblematic in dealing with dynamic load cases in the event of an incident, i.e. in particular that no moving parts have to be moved against the applied pressure of the coolant.

It is proposed in accordance with the invention to achieve this object by providing a shut-off member that can be destroyed in the closed position by a device arranged in the region of the pipe section, with the device for the destruction of the shut-off member being actuable from the outside. The shut-off member statically seals the pipe section. This means that the pipe shut-off device does not have any movable parts and consequently no seals can degrade either; the pipe shut-off device is process-safe since the opening of the pipeline does not have to take place against the applied pressure of the coolant. The coolant flow is made possible only by the destruction of the shut-off member itself. The shut-off member itself is maintenance-free; only the device for destroying the shut-off member has to be serviced. The maintenance of this device is, however, unproblematic since it is not necessary to intervene in the coolant circuit for this purpose.

Provision is thus in particular made to configure the shut-off member in the manner of a plate which is peripherally let into the pipe section of the pipe shut-off device. This means that the pipe section has a peripheral grove, with the plate being located as a shut-off member in this peripheral groove. Provision is made for forming the groove in the pipe section that the pipe section has two flanges which each have an annular nose, with said groove, which receives the plate, being formed in the transition region between the two annular noses. The connection of the two flanges can take place by screws which are distributed over the periphery in parallel with the longitudinal axis of the pipe section. The plate can in this respect be sealed in the groove with respect to the pipe section by a peripheral seal arranged at the perimeter face, with a further peripheral seal being able to be additionally arranged in the groove at least on one side in the axial direction of the pipe section. Static seals can in this respect be used as the seals since the two part components which are to be sealed with respect to one another are not movable. To this extent, seals on a graphite base can also be used which are resistant to boron-treated water.

The device for destroying the shut-off member is preferably arranged on the periphery of the pipe section in the region of the shut-off member. It becomes clear from this that the device for destroying the shut-off member acts on the perimeter face of the shut-off member which is in particular of plate form. It has been found to be particularly advantageous for the device for destroying the shut-off member to be configured as a striker. The striker is spring-loaded and is movably supported in a housing on the periphery of the tube section in the direction of the perimeter face of the shut-off member, which is in particular of plate form. The striker is advantageously held preloaded by a rope, a chain or similar against the load of the at least one spring and impacts the perimeter face of e.g. the plate after being triggered due to the spring force and the plate then shatters. It was already pointed out in the introduction that in the case of a core meltdown a rope also melts in the known pipe shut-off device, with a valve pivoting open after the melting of the rope due to the weight hereby activated. The striker which, as already stated, is under the load of at least one spring is also activated in the present case after the melting of the rope or of a chain.

The subject of the invention is likewise an apparatus for the emergency supply of coolant to the fuel rods arranged in a reactor vessel of a nuclear power plant on an incipient core meltdown, comprising a vessel for receiving the coolant which is connected to the reactor vessel by at least one pipeline, with the pipe shut-off device as described herein. In this respect the rope or the chain is guided in the region of the reactor vessel such that, on an incipient core meltdown as has already been explained, the rope is melted by the temperature which arises in this process.

BRIEF DESCRIPTION OF THE DRAWINGS

FIG. 1 is a schematic showing the vessel for receiving the coolant as well as the reactor vessel, with both being connected by a pipeline;

FIG. 2 is a cross-sectional view of pipe shut-off device; and

DETAILED DESCRIPTION OF THE INVENTION

Figure 3:
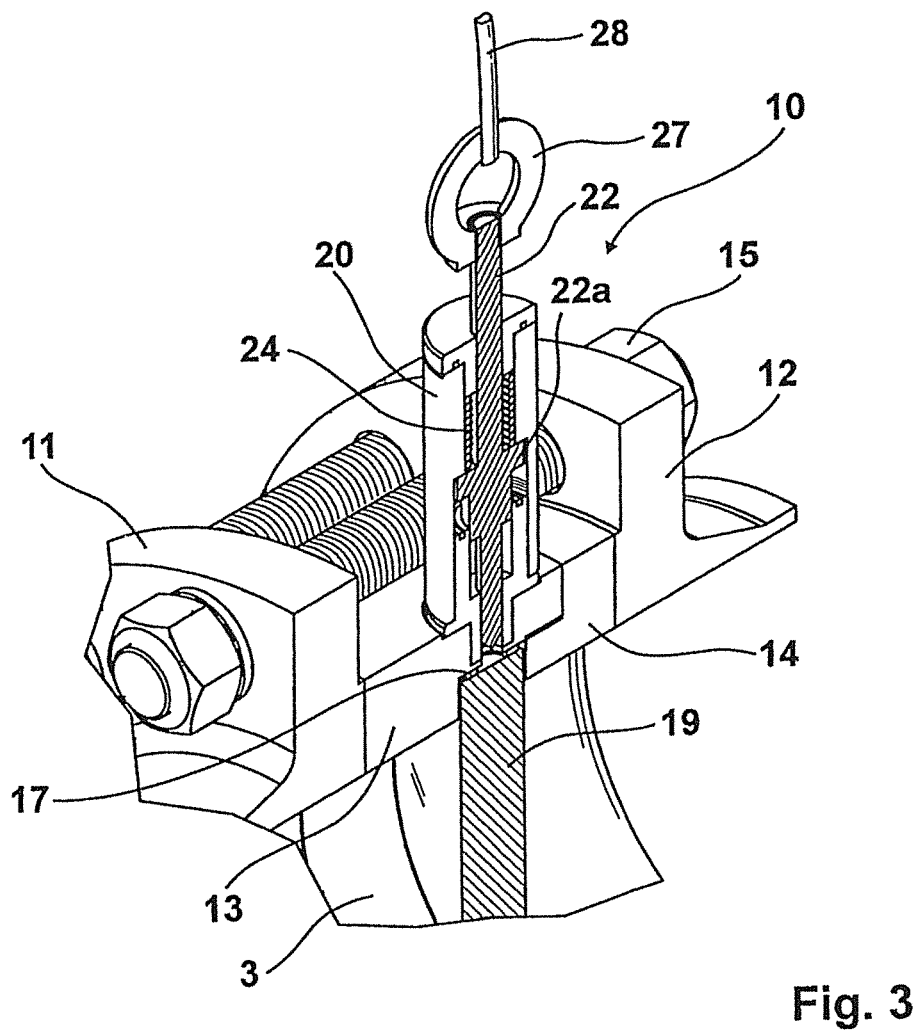
FIG. 3 is an enlarged and perspective representation of a portion of the shutoff device.

In accordance with FIG. 1, the coolant vessel is designated by 1, the reactor vessel by 2 and the pipeline which connects the coolant vessel to the reactor vessel by 3. The pipe shut-off device, which is the subject of the invention, is located in the pipeline 3 and is marked by 10.

The pipe shut-off device 10 has a pipe section 10*a* with two flanges 11 and 12 which can be connected to one another by peripherally arranged screw connections 15. Each flange 11, 12 has an annular nose 13, 14 which is dressed toward the oppositely disposed nose, with a peripheral groove 17 being formed on the inner side of the pipe shut-off device when the two flanges 11, 12 are connected by said screw connections 15. The annular noses 13, 14 overlap one another in the region of the groove. The peripheral groove 17 receives the shut-off member 19, which is configured in plate form. The plate-shaped shut-off member 19 preferably comprises a special glass which is pressure-resistant and temperature-resistant. The one annular nose 13 faces the periphery of a housing 20, with the housing 20 receiving the striker designated by 22. The striker 22 is under the load of a spring 24 in the housing 20, said spring engaging a collar 22*a* of the striker at one end and the housing at the other. The striker 22 has an eyelet 27 at the upper end for receiving a rope 28. In the region of the striker 22 and accordingly also of the housing 20, the pipe section 10*a* shows an opening 13*a* to allow the punching of the striker onto the perimeter face 19*a* of the plate 19. The striker 22 is preloaded against the spring 24 by the rope. If the rope 28 melts on a core meltdown, the pointed end of the striker 22 strikes against the perimeter face of the plate acting as a shut-off member, whereby said plate shatters into a number of single parts.

As already stated, the plate 19 is received by the groove 17. To seal the plate 19 in the groove 17, a peripheral seal 30 is arranged in the region of the perimeter face 19*a* of the plate 19, with furthermore respective peripheral seals 31 likewise being able to be provided at both sides of the plate 19, that is in the axial direction of the pipe shut-off device 10. These seals are manufactured on a graphite base since they are static.

In addition, the shut-off member, that is the plate, for example, can therefore be adhesively bonded in the groove. Various adhesives permissible in nuclear power plant construction can be used as the adhesive, for example Loctite® 5772 or Loctite® 2432.

Provision is made with respect to the peripheral seal 30 at the perimeter face that it has a cut-out (not shown) in the region of the striker 22 so that the striker directly strikes the perimeter face e.g. of the glass plate.

REFERENCE NUMERAL LIST

1 coolant vessel
2 reactor vessel
3 pipeline
10 pipeline shut-off device
10*a* pipe section
11 flange
12 flange
13 annular nose
13*a* opening in the pipe section
14 annular nose
15 screw connection
17 peripheral groove
19 shut-off member (plate)
19*a* perimeter face
20 housing
22 striker
22*a* collar at the striker
24 spring
27 eyelet
28 rope
30 peripheral seal (tangential)
31 peripheral seal (in the axial direction of the pipeline at the shut-off member)

The invention claimed is:

1. A pipeline shut-off device comprising:
a pipe section configured to be arranged in a pipeline;
a shut-off member disposed in the pipe section; and
a device arranged in the region of the pipe section and actuable from outside of the pipe section, the device being operable to destroy the shut-off member when the device is actuated from the outside of the pipe, the device including:
a housing on the periphery of the pipe section of the pipeline shut-off device;
a striker movably supported in the housing;
at least one spring engaging the striker;
a tensile element attached to and holding the striker in a preloaded position against a load of the at least one spring; and
wherein the tensile element is generally axially aligned to the striker.

2. A pipeline shut-off device in accordance with claim 1, wherein:
the shut-off member is a plate.

3. A pipeline shut-off device in accordance with claim 2, wherein:
the plate is peripherally let into the pipe section.

4. A pipeline shut-off device in accordance with claim 2, wherein:
the plate is sealed to the pipe section by a peripheral seal disposed on a perimeter face of the plate.

5. A pipeline shut-off device in accordance with claim 2, wherein:
the plate has at least one peripheral seal at least on one side in the axial direction of the pipe section.

6. A pipeline shut-off device in accordance with claim 1, wherein:
   the shut-off member is manufactured from a brittle material.

7. A pipeline shut-off device in accordance with claim 6, wherein:
   the shut-off member is manufactured from a glass, a glass-like material or a ceramic material.

8. A pipeline shut-off device in accordance with claim 1, wherein:
   the tension element is a rope, a chain or similar.

9. An apparatus for the emergency supply of coolant to the fuel rods arranged in a reactor vessel of a nuclear power plant on an incipient core meltdown, comprising:
   a vessel for receiving coolant, the vessel being connected to a reactor vessel by at least one pipeline; and
   a pipeline shut-off device in accordance with claim 1.

10. An apparatus in accordance with claim 9,
   wherein the tensile element is melted on an incipient core meltdown by the temperature arising in this process.

\* \* \* \* \*